United States Patent
Odedra

(10) Patent No.: US 9,922,033 B1
(45) Date of Patent: Mar. 20, 2018

(54) SYSTEMS AND METHODS FOR EFFICIENTLY EXTRACTING CONTENTS OF CONTAINER FILES

(71) Applicant: Veritas Technologies LLC, Mountain View, CA (US)

(72) Inventor: Shyam Odedra, Venice, CA (US)

(73) Assignee: Veritas Technologies LLC, Mountain View, CA (US)

( * ) Notice: Subject to any disclaimer, the term of this patent is extended or adjusted under 35 U.S.C. 154(b) by 268 days.

(21) Appl. No.: 14/754,734

(22) Filed: Jun. 30, 2015

(51) Int. Cl.
*G06F 17/30* (2006.01)

(52) U.S. Cl.
CPC .. *G06F 17/30073* (2013.01); *G06F 17/30589* (2013.01); *G06F 17/30864* (2013.01)

(58) Field of Classification Search
CPC ............. G06F 17/2785; G06F 11/1453; G06F 17/30156; G06F 3/0641; G06F 17/30076; G06F 11/1448; G06Q 10/107
See application file for complete search history.

(56) References Cited

U.S. PATENT DOCUMENTS

| | | | | |
|---|---|---|---|---|
| 7,913,053 | B1 * | 3/2011 | Newland | G06Q 10/107 173/165 |
| 8,140,534 | B2 * | 3/2012 | Yang | G06Q 10/107 707/741 |
| 8,650,166 | B1 | 2/2014 | Cook et al. | |
| 8,782,519 | B1 | 7/2014 | Gajjar | |
| 9,009,459 | B1 * | 4/2015 | Nachenberg | G06F 21/56 713/153 |
| 9,092,434 | B2 * | 7/2015 | Kumar | G06F 17/30873 |
| 9,298,710 | B2 * | 3/2016 | Kanamori | G06F 17/30011 |
| 9,391,935 | B1 * | 7/2016 | Gunda | H04L 51/04 |
| 2009/0319585 | A1 * | 12/2009 | Gokhale | G06F 17/30902 |
| 2011/0016091 | A1 * | 1/2011 | Prahlad | G06F 11/1453 707/654 |

(Continued)

OTHER PUBLICATIONS

Sandeep Bhatkar, et al; Systems and Methods for Detecting Malicious Documents Based on Component-Object Reuse; U.S. Appl. No. 14/073,815, filed Nov. 6, 2013.

(Continued)

*Primary Examiner* — Kris Mackes
*Assistant Examiner* — Merilyn Nguyen
(74) *Attorney, Agent, or Firm* — FisherBroyles LLP

(57) ABSTRACT

The disclosed computer-implemented method for efficiently extracting contents of container files may include (1) receiving a container file that includes (a) an additional container file that includes (i) a constituent file and (ii) metadata of the constituent file and (b) metadata of the additional container file, (2) creating, before the constituent file is extracted from the additional container file, a content hierarchy for the container file that includes (a) the metadata of the constituent file, (b) hierarchical metadata that indicates that the container file includes the additional container file, and (c) additional hierarchical metadata that indicates that the additional container file includes the constituent file, (3) querying, after the content hierarchy is created, the content hierarchy to locate the constituent file within the additional container file, (4) extracting the constituent file, and (5) performing an action on the constituent file. Various other methods, systems, and computer-readable media are also disclosed.

20 Claims, 8 Drawing Sheets

(56) References Cited

U.S. PATENT DOCUMENTS

| | | | | |
|---|---|---|---|---|
| 2011/0314384 A1* | 12/2011 | Lindgren | ............ | G06Q 10/107 715/739 |
| 2012/0226760 A1* | 9/2012 | Lewis | .................... | H04L 51/08 709/206 |
| 2012/0233130 A1* | 9/2012 | Vedachalam | ........ | G06Q 10/107 707/673 |
| 2015/0212889 A1* | 7/2015 | Amarendran | ....... | G06F 11/1402 707/674 |
| 2016/0253254 A1* | 9/2016 | Krishnan | ............ | G06F 11/3612 717/124 |
| 2016/0344667 A1* | 11/2016 | Lane | ....................... | H04L 51/08 |

OTHER PUBLICATIONS

Aeham Abushwashi; Systems and Methods for Maintaining Aggregate Tables in Databases; U.S. Appl. No. 14/447,619, filed Jul. 31, 2014.

Kirk Searls, et al; Systems and Methods for Facilitating Analytics on Data Sets Stored in Remote Monolithic Files; U.S. Appl. No. 14/580,079, filed Dec. 22, 2014.

"Symantec Enterprise Vault.cloud", http://www.symantec.com/enterprise-vault-cloud/, as accessed Apr. 24, 2015, Symantec Corporation, (Jan. 18, 2012).

* cited by examiner

```
                    Content Hierarchy
                          600
---------------------------------------------------------------
***********************************************
<attachments>
 <attachment>
   <filename>EMLL1.zip</filename>
   <attachmentsizemb>5.5</attachmentsizemb>
   <attachment>
     <filename>EMLL2.txt</filename>
     <attachmentsizemb>1</attachmentsizemb>
   </attachment>
   <attachment>
     <filename>EMLL3.zip</filename>
     <attachmentsizemb>5.3</attachmentsizemb>
     <attachment>
       <filename>EMLL4.txt</filename>
       <attachmentsizemb>0.6</attachmentsizemb>
     </attachment>
     <attachment>
       <filename>EMLL5.rar</filename>
       <attachmentsizemb>5</attachmentsizemb>
       <attachment>
         <filename>EMLL6.txt</filename>
         <attachmentsizemb>1</attachmentsizemb>
       </attachment>
       <attachment>
         <filename>EMLL7.pdf</filename>
         <attachmentsizemb>5</attachmentsizemb>
       </attachment>
     </attachment>
   </attachment>
 </attachment>
</attachments>
***********************************************
```

*FIG. 6*

SYSTEMS AND METHODS FOR EFFICIENTLY EXTRACTING CONTENTS OF CONTAINER FILES

BACKGROUND

Enterprises are often concerned with how best to manage the volume of emails and other files that they and their employees amass during the course of doing business. For example, a typical employee may, on a daily basis, send and/or receive tens if not hundreds of emails and may create many other files. For legal or other information retention reasons, an enterprise may need to retain these emails and files in a manageable and efficient way. Enterprises may use a variety of file management and archiving technologies as a way to manage the retention of large numbers of emails and files. For example, an enterprise may use an email archiving system to reduce the number of emails stored on an employee's computing device by storing the emails on an archiving server.

Conventional file archiving systems may index the files that they manage to facilitate later identification of the files. When a conventional file archiving system first receives a file, the file archiving system may (1) convert the file to text, (2) parse the text for data that may facilitate later identification of the file (e.g., a subject, content, recipients of an email), and (3) index the extracted data. Unfortunately, conventional file archiving systems may be unable to efficiently index container files (e.g., emails that include attachments and/or archive files that include compressed files) and their constituent files. For example, when some conventional file archiving systems first receive a container file, the file archiving systems may (1) convert a portion of the container file to text, (2) parse the text for data that may facilitate later identification of the container file, (3) index the extracted data, and (4) completely ignore the container file's constituent files.

In other examples, when some conventional file archiving systems first receive a container file, the file archiving systems may (1) extract all of the container file's constituent files, (2) convert the container file and its constituent files to text, (3) parse the text for data that may facilitate later identification of the files, and (4) index the extracted data. However, by extracting, converting, parsing, and/or indexing all of a container file's constituent files, these conventional file archiving systems may waste valuable resources, especially if (1) the container file's constituent files are nested within many layers of additional container files and/or (2) an enterprise does not need to later identify some of the container file's constituent files (e.g., an enterprise may only be interested in later identifying certain types of files). In an attempt to overcome these limitations, some conventional file archiving systems may index constituent files to a fixed depth or simply extract as many constituent files as possible in a given amount of time. Accordingly, the instant disclosure identifies and addresses a need for additional and improved systems and methods for extracting contents of container files.

SUMMARY

As will be described in greater detail below, the instant disclosure describes various systems and methods for efficiently extracting contents of container files by creating content hierarchies for the container files before and/or without extracting or converting any or all of the container files' constituent files. In one example, a computer-implemented method for efficiently extracting contents of container files may include (1) receiving, at a first stage (e.g., a physical or temporal stage or phase) of a file management system, a first container file that includes (a) a second container file that includes (i) a constituent file and (ii) metadata of the constituent file and (b) metadata of the second container file, (2) creating, at the first stage of the file management system and before the constituent file is extracted from the second container file, a content hierarchy for the first container file that includes (a) the metadata of the constituent file, (b) first hierarchical metadata that indicates that the first container file includes the second container file, and (c) second hierarchical metadata that indicates that the second container file includes the constituent file, (3) querying, after the content hierarchy has been created, the content hierarchy to locate the constituent file within the second container file, (4) extracting, at a second stage of the file management system, the constituent file from the second container file, and (5) performing a file-management action on the constituent file. In at least one embodiment, the metadata of the second container file may be separate and distinct from the second container file, and the metadata of the constituent file may be separate and distinct from the constituent file.

In some embodiments, the file management system may include a computing node that may include hardware resources that are optimized to parse container-file metadata and an additional computing node that may include additional hardware resources that are optimized to extract files from container files. In certain embodiments, the first stage of the file management system may be performed by the computing node, and the second stage of the file management system may be performed by the additional computing node.

In some embodiments, the file management system may include a file archiving system. In certain embodiments, the file management system may include an email archiving system, the first container file may include an email, and the second container file may include an attachment of the email.

In some embodiments, the second hierarchical metadata may indicate that the constituent file is at a hierarchical level within the first container file, and the step of querying the content hierarchy to locate the constituent file within the second container file may include querying the content hierarchy to locate one or more files at the hierarchical level within the first container file.

In some embodiments, the metadata of the constituent file may include a file type of the constituent file, and the step of querying the content hierarchy to locate the constituent file within the second container file may include querying the content hierarchy to locate one or more files of the file type of the constituent file.

In some embodiments, the metadata of the constituent file may include a size of the constituent file, and the step of querying the content hierarchy to locate the constituent file within the second container file may include querying the content hierarchy to locate one or more files that are of the size.

In some embodiments, the step of performing the file-management action on the constituent file may include converting the constituent file to a text-based representation of the constituent file. In at least one embodiment, the step of performing the file-management action on the constituent file may include using the text-based representation of the constituent file to index the constituent file.

In some embodiments, the computer-implemented method may further include (1) receiving, after the content hierarchy has been created, a request for the metadata of the constituent file, (2) locating the metadata of the constituent file stored within the content hierarchy, and (3) responding to the request with the metadata of the constituent file stored within the content hierarchy.

In some embodiments, the first container file may include a second constituent file, and the step of extracting the constituent file from the second container file may be performed without extracting the second constituent file from the first container file.

In some embodiments, the content hierarchy may include hierarchical metadata for each file contained within the first container file, and the content hierarchy may be completely created at the first stage of the file management system before any file is extracted at the second stage of the file management system. In at least one embodiment, no files may be extracted from the first container file at the first stage of the file management system.

In some embodiments, the first container file may include a third container file, the third container file may include the second container file, the first hierarchical metadata may indicate that the first container file includes the third container file, and the content hierarchy may include third hierarchical metadata that indicates that the third container file may include the second container file.

In one embodiment, a system for implementing the above-described method may include (1) a file-receiving module, stored in memory, that receives, at a first stage of a file management system, a first container file that includes (a) a second container file that includes (i) a constituent file and (ii) metadata of the constituent file and (b) metadata of the second container file, (2) a creating module, stored in memory, that creates, at the first stage of the file management system and before the constituent file is extracted from the second container file, a content hierarchy for the first container file that includes (a) the metadata of the constituent file, (b) first hierarchical metadata that indicates that the first container file includes the second container file, and (c) second hierarchical metadata that indicates that the second container file includes the constituent file, (3) a locating module, stored in memory, that queries, after the content hierarchy has been created, the content hierarchy to locate the constituent file within the second container file, (4) an extracting module, stored in memory, that extracts, at a second stage of the file management system, the constituent file from the second container file, (5) a file-management module, stored in memory, that performs a file-management action on the constituent file, and (6) at least one processor that executes the file-receiving module, the creating module, the locating module, the extracting module, and the file-management module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, at a first stage of a file management system, a first container file that includes (a) a second container file that includes (i) a constituent file and (ii) metadata of the constituent file and (b) metadata of the second container file, (2) create, at the first stage of the file management system and before the constituent file is extracted from the second container file, a content hierarchy for the first container file that includes (a) the metadata of the constituent file, (b) first hierarchical metadata that indicates that the first container file includes the second container file, and (c) second hierarchical metadata that indicates that the second container file includes the constituent file, (3) query, after the content hierarchy has been created, the content hierarchy to locate the constituent file within the second container file, (4) extract, at a second stage of the file management system, the constituent file from the second container file, and (5) perform a file-management action on the constituent file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 6 is a block diagram of an exemplary content hierarchy.

Figure 1:
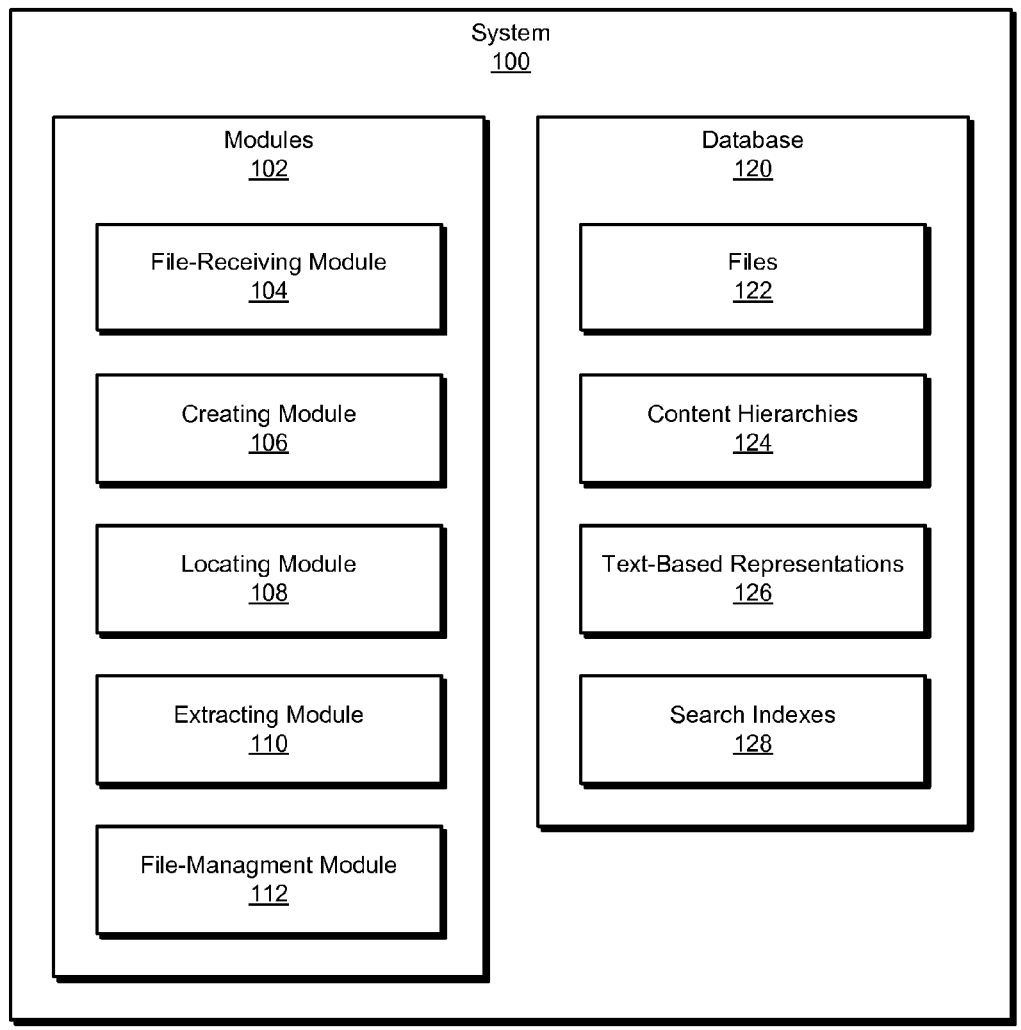
FIG. 1 is a block diagram of an exemplary system for efficiently extracting contents of container files.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for efficiently extracting contents of container files. As will be explained in greater detail below, by parsing file metadata contained within a container file before and/or without extracting or converting any or all of the container file's constituent files, the systems and methods described herein may create a content hierarchy for the container file that (1) includes the file metadata and hierarchical metadata of the container file's constituent files and that (2) may enable on-demand extraction of less than all of the container file's constituent files. Furthermore, in some examples, by enabling extraction of less than all of the container file's constituent files, the system and methods described herein may improve throughput of file archiving systems.

Moreover, by creating a content hierarchy for a container file before extracting the container file's constituent files, these systems and methods may perform metadata-parsing and file-extraction responsibilities on dedicated nodes within a cloud-based computing environment that are independently optimized to perform these different responsibilities. Embodiments of the instant disclosure may also provide various other advantages and features, as discussed in greater detail below.

Figure 2:
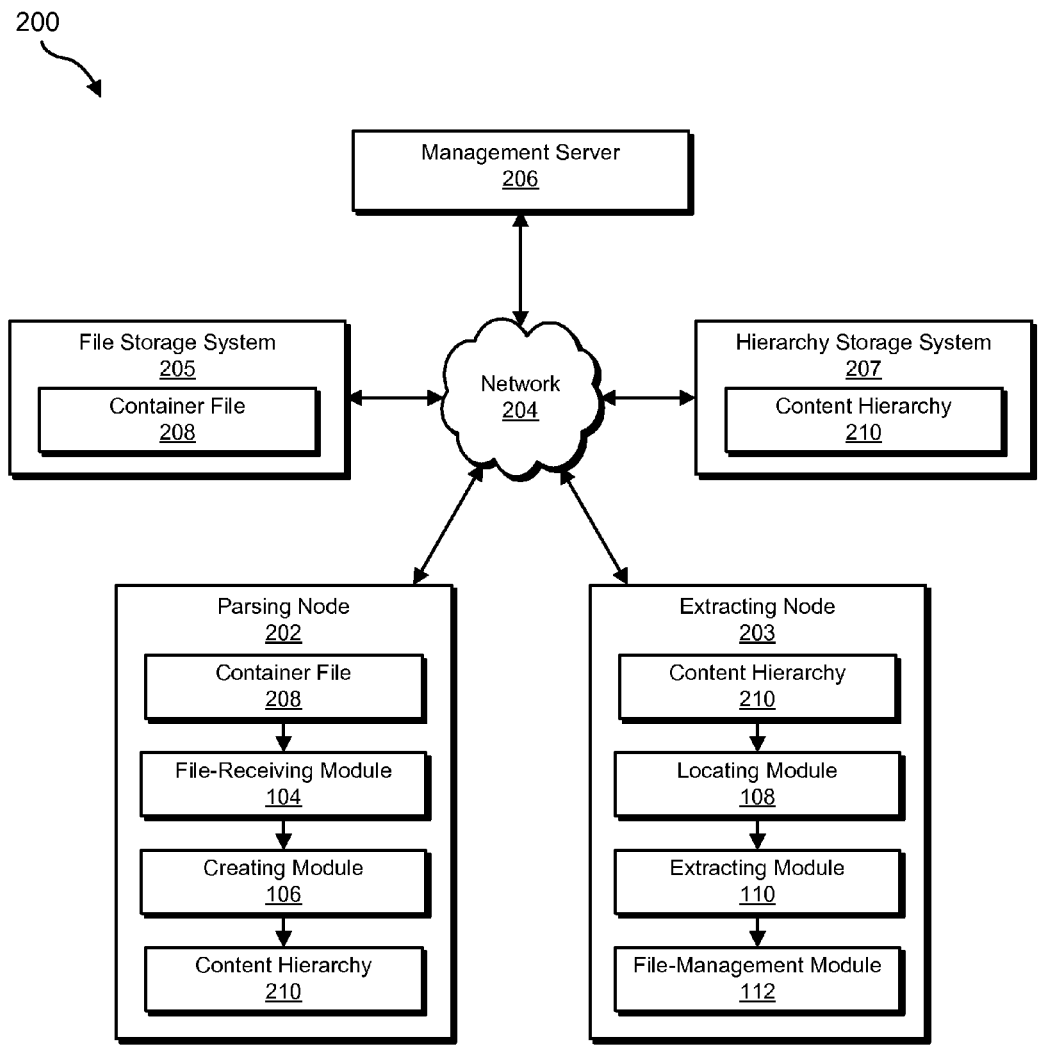
FIG. 2 is a block diagram of an additional exemplary system for efficiently extracting contents of container files.

The following will provide, with reference to FIGS. 1-2, detailed descriptions of exemplary systems for efficiently extracting contents of container files. Detailed descriptions of corresponding computer-implemented methods will also be provided in connection with FIGS. 3-6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for efficiently extracting contents of container files. As illustrated in this figure, exemplary system 100 may include one or more modules 102 for performing one or more tasks. For example, and as will be explained in greater detail below, exemplary system 100 may include a file-receiving module 104 that receives, at a first stage of a file management system, a first container file that includes (a) a second container file that includes (i) a constituent file and (ii) metadata of the constituent file and (b) metadata of the second container file. Exemplary system 100 may also include a creating module 106 that creates, at the first stage of the file management system and before the constituent file is extracted from the second container file, a content hierarchy for the first container file that includes (a) the metadata of the constituent file, (b) first hierarchical metadata that indicates that the first container file includes the second container file, and (c) second hierarchical metadata that indicates that the second container file includes the constituent file.

In addition, and as will be described in greater detail below, exemplary system 100 may include a locating module 108 that queries, after the content hierarchy has been created, the content hierarchy to locate the constituent file within the second container file. Exemplary system 100 may also include an extracting module 110 that extracts, at a second stage of the file management system, the constituent file from the second container file. Exemplary system 100 may also include a file-management module 112 that performs a file-management action on the constituent file. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., parsing node 202, extracting node 203, or management server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may include files 122 for storing one or more container files and/or one or more constituent files, content hierarchies 124 for storing file metadata and/or hierarchical metadata about files contained in container files, text-based representations 126 for storing information about one or more text-based representations of the files stored within files 122, and/or search indexes 128 for storing information that facilitates text-based searches of the files stored within files 122.

Database 120 may represent portions of a single database or computing device or a plurality of databases or computing devices. For example, database 120 may represent a portion of management server 206 in FIG. 2, computing system 710 in FIG. 7, and/or portions of exemplary network architecture 800 in FIG. 8. Alternatively, database 120 in FIG. 1 may represent one or more physically separate devices capable of being accessed by a computing device, such as parsing node 202, extracting node 203, or management server 206 in FIG. 2, computing system 710 in FIG. 7, and/or portions of exemplary network architecture 800 in FIG. 8.

Exemplary system 100 in FIG. 1 may be implemented in a variety of ways. For example, all or a portion of exemplary system 100 may represent portions of exemplary file management system 200 in FIG. 2. As used herein, the term "file management system" generally refers to any system that stores and/or manages access to files. In some examples, file management system 200 may represent all or a portion of a file archiving system. In at least one example, file management system 200 may represent all or a portion of an email archiving system. In some examples, file management system 200 may represent a cloud-based file management system.

As shown in FIG. 2, system 200 may include a parsing node 202, an extracting node 203, a file storage system 205, a management server 206, and a hierarchy storage system 207 in communication via a network 204. In one example, parsing node 202 may be programmed with file-receiving module 104 and creating module 106, and extracting node 203 may be programmed with locating module 108, extracting module 110, and file-management module 112. Additionally or alternatively, parsing node 202, extracting node 203, file storage system 205, management server 206, and/or hierarchy storage system 207 may be programmed with one or more of modules 102 and/or may store all or a portion of the data in database 120.

In one embodiment, one or more of modules 102 from FIG. 1 may, when executed by at least one processor of parsing node 202, extracting node 203, and/or management server 206, enable parsing node 202, extracting node 203, and/or management server 206 to efficiently extract contents of container files. For example, and as will be described in greater detail below, one or more of modules 102 may cause parsing node 202, extracting node 203, and/or management server 206 to (1) receive, at parsing node 202, a container file 208 that includes (a) a second container file (e.g., container file 412 in FIG. 4) that includes (i) a constituent file (e.g., document file 432 or document file 434 in FIG. 4) and (ii) metadata of the constituent file (e.g., metadata 442 or metadata 444 in FIG. 4) and (b) metadata of the second container file (e.g., metadata 422 in FIG. 4), (2) create, at parsing node 202 and before the constituent file is extracted from the second container file, a content hierarchy 210 for the first container file that includes (a) the metadata of the constituent file, (b) first hierarchical metadata that indicates that the first container file includes the second container file, and (c) second hierarchical metadata that indicates that the second container file includes the constituent file, (3) query, after content hierarchy 210 has been created, content hierarchy 210 to locate the constituent file within the second container file, (4) extract, at extracting node 203, the constituent file from the second container file, and (5) perform a file-management action on the constituent file.

Parsing node 202 and extracting node 203 generally represent any type or form of physical or virtual computing system (e.g., exemplary computing system 710 in FIG. 7) that is capable of reading computer-executable instructions. Examples of parsing device 202 and extracting device 203 include, without limitation, physical or virtual application servers and database servers configured to provide various database services and/or run certain software applications. In some examples, parsing node 202 may represent a computing node that has hardware resources that are optimized to parse container-file metadata, and extracting node 203 may represent a computing node that has hardware resources that are optimized to extract files from container files. In certain examples, parsing node 202 may perform first-stage operations of file management system 200 (e.g., file-metadata parsing and content-hierarchy creation), while extracting node 203 may perform second-stage operations of file management system 200 (e.g., file extraction and file conversion). In some examples, file management system 200 may scale to handle more first-stage operations by spawning additional parsing nodes (e.g., in a virtual environment). Similarly, file management system 200 may scale to handle more second-stage operations by spawning additional extracting nodes.

Management server 206 generally represents any type or form of physical or virtual computing system (e.g., exemplary computing system 710 in FIG. 7) that is capable of performing file management functions. Examples of management server 206 include, without limitation, application servers and database servers configured to provide various database services and/or run certain software applications. In some examples, management server 206 may orchestrate file-management operations of file-management system 200.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 800 in FIG. 8, or the like. Network 204 may facilitate communication or data transfer using wireless or wired connections. In one embodiment, network 204 may facilitate communication between parsing node 202, extracting node 203, file storage system 205, management server 206, and/or hierarchy storage system 207.

File storage system 205 and hierarchy storage system 207 may represent portions of a single storage device and/or computing device or a plurality of storage devices and/or computing devices. For example, file storage system 205 and/or hierarchy storage system 207 may represent a portion of computing system 710 in FIG. 7 and/or portions of exemplary network architecture 800 in FIG. 8. Alternatively, file storage system 205 and hierarchy storage system 207 may represent one or more physically separate devices capable of being accessed by a computing device, such as computing system 710 in FIG. 7 and/or portions of exemplary network architecture 800 in FIG. 8.

Figure 3:
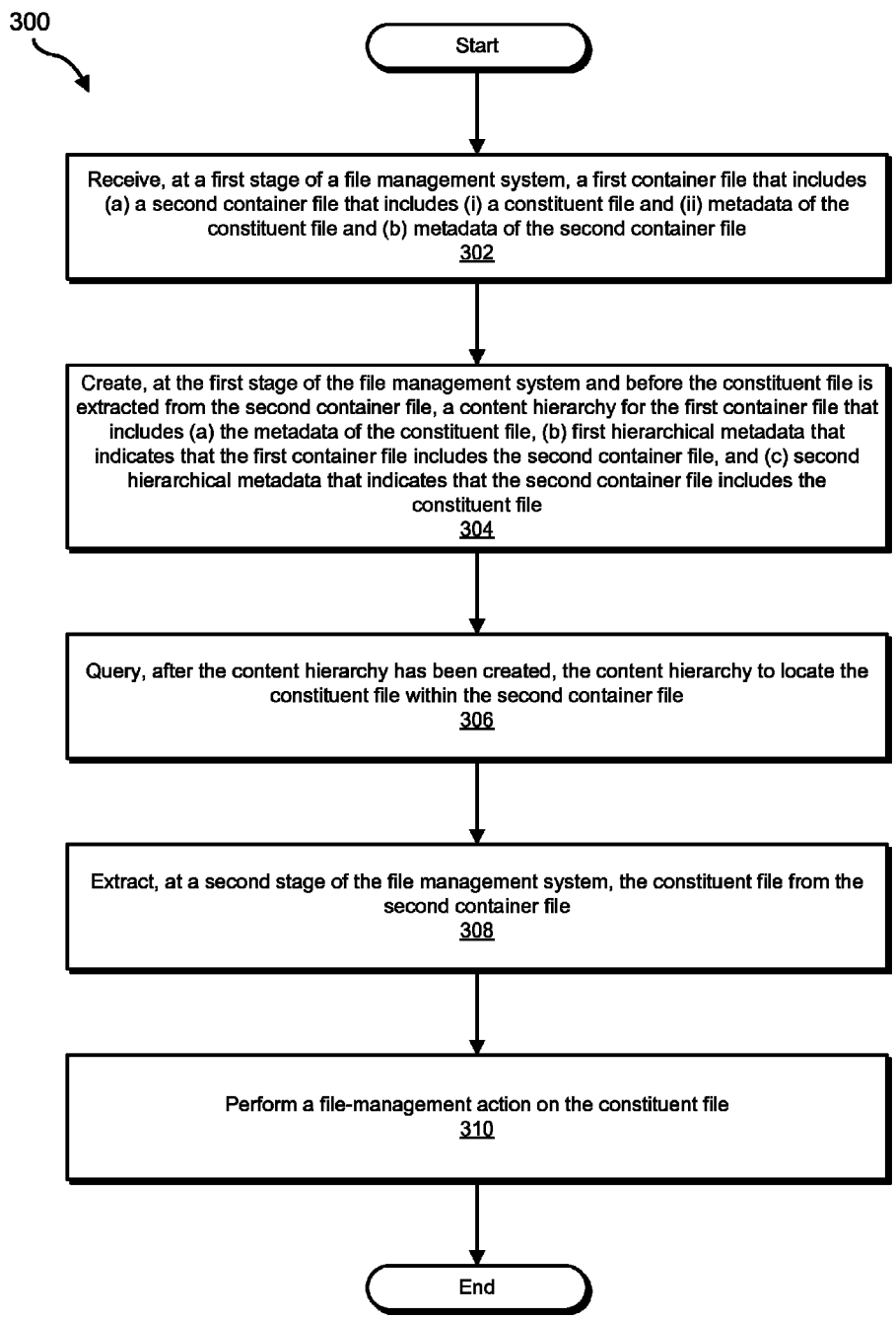
FIG. 3 is a flow diagram of an exemplary method for efficiently extracting contents of container files.

FIG. 3 is a flow diagram of an exemplary computer-implemented method 300 for efficiently extracting contents of container files. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 one or more of the systems described herein may receive, at a first stage of a file management system, a first container file that includes (a) a second container file that includes (i) a constituent file and (ii) metadata of the constituent file and (b) metadata of the second container file. For example, file-receiving module 104 may, as part of parsing node in FIG. 2, receive container file 208 in FIG. 2 or email 500 in FIG. 5.

As used herein, the term "container file" generally refers to any file that contains one or more constituent files. Examples of container files include, without limitation, email files (e.g., .EML files), compressed files (such as .ZIP, .TAR, or .RAR files), file system directories, file system folders, mailboxes, mailbox folders, backups, or virtual machine disk files (VMDKs). The term "constituent file" generally refers to any file contained within a container file. Examples of constituent files include, without limitation, document files (e.g., .TXT, .DOC, or .PDF files), executable files (e.g., .EXE files), and/or any container file. In some examples, a constituent file may be nested within two or more container files. For example, document file 432 in FIG. 4 may be considered nested within container file 412 and container file 208.

In addition to constituent files, a container file may include file metadata that is separate and distinct from its constituent files. As used herein, the terms "metadata" and "file metadata" may refer to any data that describes a constituent file of a container file and that may be derived without completely or partially extracting (e.g., decompressing, decoding, decrypting, or converting) the constituent file from the container file. For example, the terms "metadata" and "file metadata" may refer to data that is contained in a .ZIP file and that (1) describes files contained in the .ZIP file and (2) is stored in the local file headers, data descriptors, and/or central directory of the .ZIP file, which may be separate and distinct from the files themselves. In another example, the terms "metadata" and "file metadata" may refer to data that is contained in a .EML file and that (1) describes attachments contained in the .EML file and (2) is stored in header fields (e.g., Content-Type, Content-Description, and/or Content-Disposition header fields) contained within the .EML file, which may be separate and distinct from the attachments themselves. In some examples, file metadata and constituent files may be stored in different portions of the container file of which they are a part. In at least one example, the terms "metadata" and "file metadata" may refer to any data that may be derived from the contents of a constituent file without completely or partially extracting the constituent file from the container file in which it is located. Examples of file metadata include, without limitation, file properties such as a file name, file size, file type, a timestamp of when a file was created, and/or a timestamp of when a file was last modified.

Figure 4:
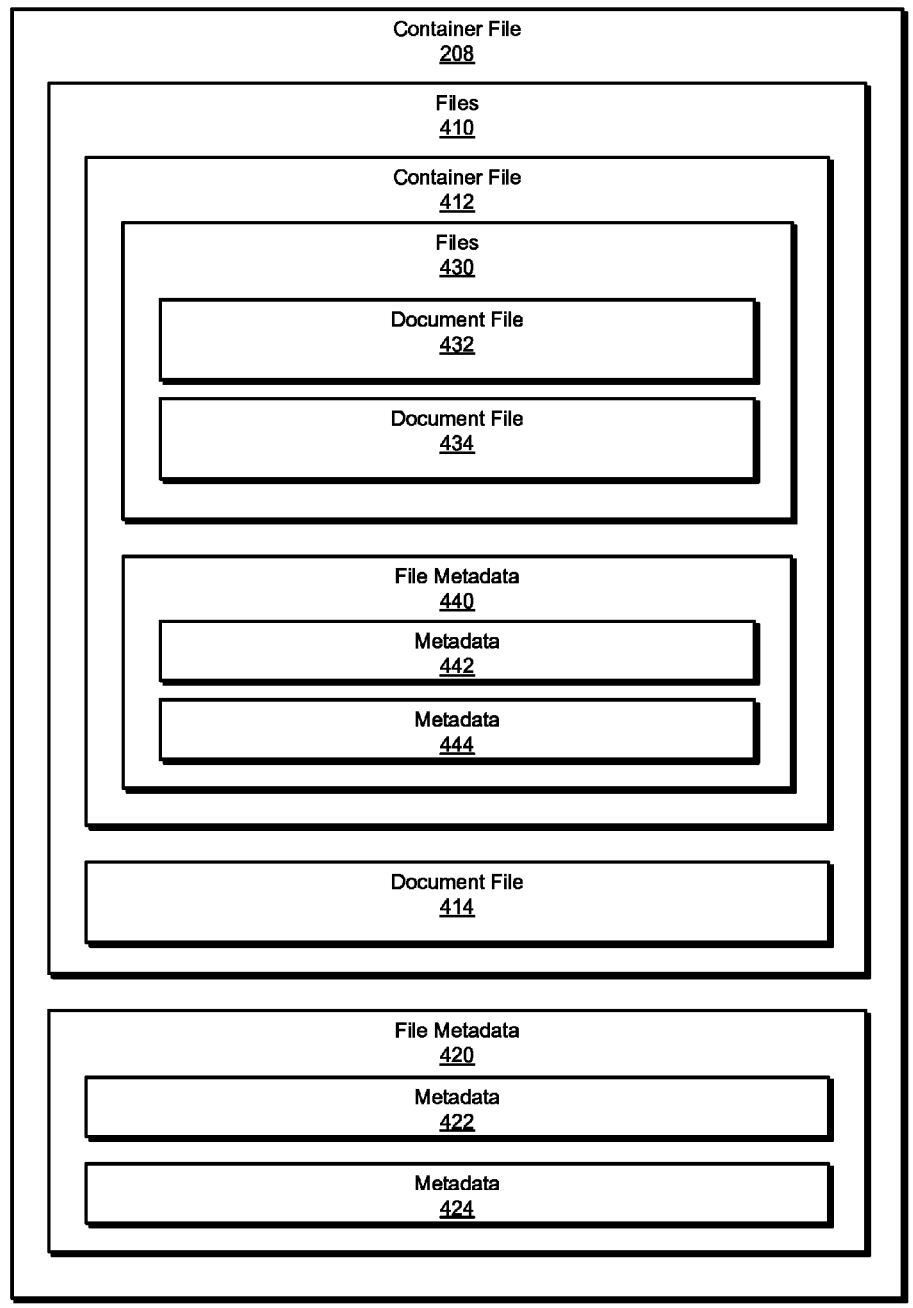
FIG. 4 is a block diagram of an exemplary container file.

FIG. 4 provides an illustration of an exemplary container file 208. As shown in FIG. 4, container file 208 may include files 410 (e.g., container file 412 and document file 414) and file metadata 420 (e.g., metadata 422 and metadata 424). In this example, metadata 422 may represent metadata of container file 412, and metadata 424 may represent metadata of document file 414. As shown in FIG. 4, container file 412 may include files 430 (e.g., document file 432 and document file 434) and file metadata 440 (e.g., metadata 442 and metadata 444). In this example, metadata 442 may represent metadata of document file 432, and metadata 444 may represent metadata of document file 434.

Figure 5:
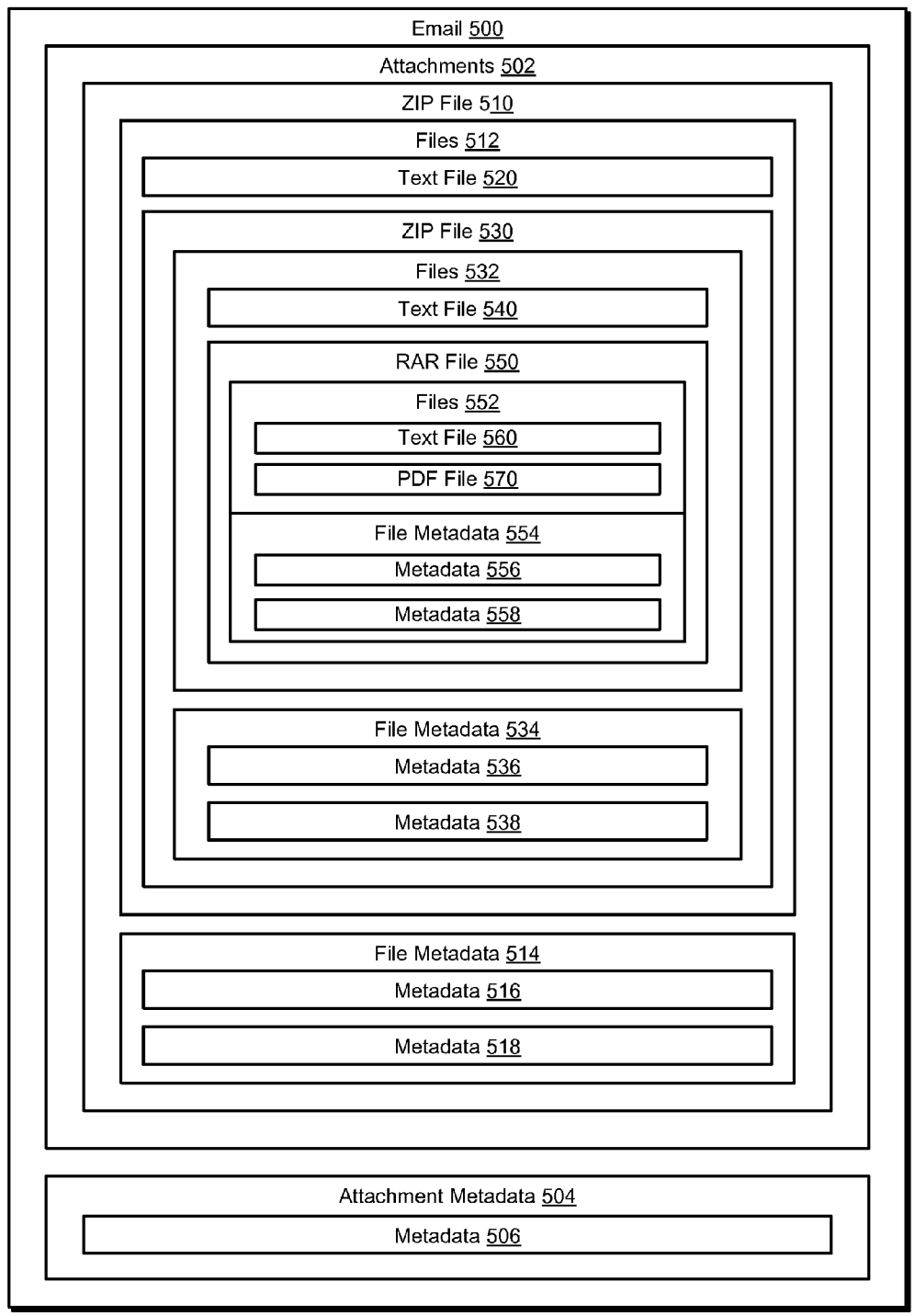
FIG. 5 is a block diagram of another exemplary container file.

FIG. 5 provides an illustration of another exemplary container file. As shown in FIG. 5, email 500 may include one or more attachments 502 (e.g., ZIP file 510) and attachment metadata 504 (e.g., metadata 506). In this example, metadata 506 may represent metadata of ZIP file 510. As shown in FIG. 5, ZIP file 510 may include files 512 (e.g., text file 520 and ZIP file 530) and file metadata 514 (e.g., metadata 516 and 518). In this example, metadata 516 may represent metadata of text file 520, and metadata 518 may represent metadata of ZIP file 530. As shown in FIG. 5, ZIP file 530 may include files 532 (e.g., text file 540 and RAR file 550) and file metadata 534 (e.g., metadata 536 and 538). In this example, metadata 536 may represent metadata of text file 540, and metadata 538 may represent metadata of RAR file 550. As shown in FIG. 5, RAR file 550 may include files 552 (e.g., text file 560 and PDF file 570) and file metadata 554 (e.g., metadata 556 and 558). In this example, metadata 556 may represent metadata of text file 560, and metadata 558 may represent metadata of PDF file 570.

Returning to FIG. 3 at step 304, one or more of the systems described herein may create, at the first stage of the file management system and before the constituent file is extracted from the second container file, a content hierarchy for the first container file that includes (a) the metadata of the constituent file, (b) first hierarchical metadata that indicates that the first container file includes the second container file, and (c) second hierarchical metadata that indicates that the second container file includes the constituent file. For example, creating module 106 may, as part of parsing node 202 in FIG. 2, create content hierarchy 210 for container file 208 before one or more constituent files (e.g., any or all of container file 412, document file 414, document file 432, and document file 434) are extracted from container file 208. In another example, creating module 106 may, as part of parsing node 202 in FIG. 2, create content hierarchy 600 in FIG. 6 for email 500 in FIG. 5 before one or more constituent files are extracted from email 500.

The systems described herein may perform step 304 in any suitable manner. In one example, creating module 106 may recursively parse a container file to identify (1) the container file's constituent files, (2) metadata of the constituent files, and (3) the hierarchical location of the constituent files within the hierarchical structure of the container file and/or any container files nested within the container file. Creating module 106 may then store this information as a content hierarchy for the container file.

As used herein, the term "content hierarchy" generally refers to any collection of data that includes (1) metadata of a container file's constituent files and (2) hierarchical metadata of the constituent files that indicates the hierarchical location of the constituent files within the hierarchical structure of the container file and/or any container files nested within the container file. The term "hierarchical metadata," as used herein, generally refers to any data about a container file's constituent files that may be used to locate the constituent files within the container file. In some examples, the term "hierarchical metadata" may refer to metadata that indicates a hierarchical level at which a constituent file may be located within a container file. Using FIG. 4 as an example, hierarchical metadata of container file 412 and document file 414 may indicate that container file 412 and document file 414 are first-level constituent files of container file 208, and hierarchical metadata of document file 432 and document file 434 may indicate that document file 432 and document file 434 are second-level constituent files of container file 208. Using FIG. 5 as another example, hierarchical metadata of text file 560 and PDF file 570 may indicate that text file 560 and PDF file 570 are fourth-level constituent files of email 500.

In some examples, creating module 106 may parse container files for file metadata using parsing plug-ins that are configured to parse file metadata of one or more types of container files. As such, creating module 106 may identify a suitable parsing plug-in to parse file metadata from each container file that creating module 106 encounters as part of creating a content hierarchy. The term "parsing plug-in," as used herein, generally refers to any type or form of module, client, and/or component that interfaces with creating module 106, takes as input a container file, parses file metadata of the container file's constituent files without extracting the constituent files from the container file, and outputs the file metadata to creating module 106. By using a plug-in infrastructure to parse container files for file metadata, the systems and methods described herein may enable third-party developers to create parsing plug-ins for new and/or updated container-file types.

In some examples, creating module 106 may store a content hierarchy of a container file as a file with a hierarchical-tree structure, such as an .XML (eXtensible Markup Language) file). FIG. 6 illustrates an exemplary content hierarchy 600 of email 500 in FIG. 5 that has been stored as an .XML file. As shown in FIG. 6, content hierarchy 600 includes various XML tags that indicate the file metadata and hierarchical metadata of the constituent files of email 500. As shown in this example, content hierarchy 600 indicates that (1) ZIP file 510 is a first-level attachment of email 500 with a filename of "EMLL1.zip" and a size of 5.5 megabytes, (2) text file 520 is a second-level attachment of email 500 contained within ZIP file 510 with a filename of "EMLL2.txt" and a size of 1 megabyte, (3) ZIP file 530 is another second-level attachment of email 500 contained within ZIP file 510 with a filename of "EMLL3.zip" and a size of 5.3 megabytes, (4) text file 540 is a third-level attachment of email 500 contained within ZIP file 530 with a filename of "EMLL4.txt" and a size of 0.6 megabytes, (5) RAR file 550 is another third-level attachment of email 500 contained within ZIP file 530 with a filename of "EMLL5.rar" and a size of 5 megabytes, (6) text file 560 is a fourth-level attachment of email 500 contained within RAR file 550 with a filename of "EMLL6.txt" and a size of 1 megabytes, and (7) PDF file 570 is another fourth-level attachment of email 500 contained within RAR file 550 with a filename of "EMLL7.pdf" and a size of 5 megabytes.

In some examples, creating module 106 may store a content hierarchy of a container file as structured data within one or more databases (e.g., content hierarchies 122) using, for example, a structured query language (SQL) schema.

At step 306, one or more of the systems described herein may query, after the content hierarchy has been created, the content hierarchy to locate the constituent file within the second container file. For example, locating module 108 may, as part of extracting module 203 in FIG. 2, query content hierarchy 210 to locate one or more constituent files of container file 208.

The systems described herein may perform step 306 in any suitable manner. For example, locating module 108 may query a content hierarchy of a container file to identify and/or locate one or more of the container file's constituent files by querying the content hierarchy for container files with certain combinations of file-metadata and/or hierarchical-metadata attributes. For example, locating module 108 may query a content hierarchy of a container file for one or more files at a particular hierarchical level within the container file. Using FIG. 5 as an example, locating module 108 may identify text file 520 and ZIP file 530 within email 500 by querying content hierarchy 600 for second-level constituent files of email 500. Additionally or alternatively, locating module 108 may query a content hierarchy of a container file for one or more files within a particular number of hierarchical levels within the container file. Using FIG. 5 as an example, locating module 108 may identify ZIP file 510, text file 520 and ZIP file 530 within email 500 by querying content hierarchy 600 for constituent files within the first two hierarchical levels of email 500.

In some examples, locating module 108 may query a content hierarchy of a container file for one or more files within the container file that are a particular type of file. Using FIG. 5 as an example, locating module 108 may identify text file 520, text file 540, and text file 560 by querying content hierarchy 600 for text files contained within email 500.

In some examples, locating module 108 may query a content hierarchy of a container file for one or more files within the container file that are contained within a particular type of container file. Using FIG. 5 as an example, locating module 108 may identify text file 560 and PDF file 570 by querying content hierarchy 600 for files contained within .RAR files contained within email 500.

Locating module 108 may query content hierarchies to locate constituent files in a variety of contexts. For example, locating module 108 may query, as part of a search system, content hierarchies to locate constituent files that will be indexed. In this context, the content hierarchies described herein may enable the search system to identify and index only those constituent files that are of interest to searching entities. In some examples, a searching entity may be interested in searching only certain types of files, files contained in certain types of container files, and/or files up to and/or at a certain hierarchical level within container files. In these examples, the content hierarchies described herein may enable the search system to identify and index only those constituent files that are of certain types of files, files contained in certain types of container files, and/or files up to and/or at a certain hierarchical level within container files.

In other examples, locating module 108 may query, as part of a file-browsing system, content hierarchies to identify constituent files contained within container files of interest. For example, locating module 108 may query, as part of an email system, content hierarchies to identify constituent files contained within an email of interest. In the context of file-browsing systems, the content hierarchies described herein may enable the file-browsing system to identify and provide metadata of constituent files without needing to first extract the constituent files. Moreover, in some examples, a searching entity may be interested in viewing only certain types of constituent files, constituent files contained in certain types of container files, and/or constituent files up to and/or at a certain hierarchical level within container files. In these examples, the content hierarchies described herein may enable the file-browsing system to identify and provide metadata of only those constituent files that are of interest to a browsing entity. In these examples, locating module 108 may (1) receive a request for metadata of a constituent file of a container file, (2) locate the metadata of the constituent file within a content hierarchy of the container file, and (3) respond to the additional request with the metadata of the constituent file stored within the content hierarchy without having first extracted the constituent file from the container file.

At step 308, one or more of the systems described herein may extract, at a second stage of the file management system, the constituent file from the second container file. For example, extracting module 110 may, as part of extracting node 203 in FIG. 2, extract one or more constituent files of container file 208.

The systems described herein may perform step 308 in any suitable manner. For example, extracting module 110 may extract a constituent file from a container file by decompressing, decoding, and/or decrypting the constituent file. Using FIG. 4 as an example, extracting module 110 may extract document file 414 from container file 208 by decompressing document file 414 from container file 208. In some examples, extracting module 110 may extract a constituent file from a container file without extracting other constituent files from the container file. Using FIG. 4 as an example, extracting module 110 may extract document file 414 from container file 208 without extracting container file 412, document file 432, or document file 434.

If a constituent file is located within one or more nested container files, creating module 106 may recursively extract the nested container files and then extract the constituent file. Using FIG. 5 as an example, extracting module 110 may extract text file 540 from email 500 by extracting ZIP file 510 from email 500, extracting ZIP file 530 from ZIP file 510, and extracting text file 540 from ZIP file 530.

In some examples, extracting module 110 may extract a constituent file from a container file using extracting plug-ins that are configured to extract files from one or more types of container files. As such, extracting module 110 may identify a suitable extracting plug-in to extract constituent files from the container files that extracting module 110 encounters. The term "extracting plug-in," as used herein, generally refers to any type or form of module, client, and/or component that interfaces with extracting module 110, takes as input a container file and a reference to one or more constituent files of the container file, extracts the one or more constituent files from the container file, and outputs the constituent files to extracting module 110. By using a plug-in infrastructure to extract files from container files, the systems and methods described herein may enable third-party developers to create extracting plug-ins for new and/or updated container-file types.

At step 310, one or more of the systems described herein may perform a file-management action on the constituent file. For example, file-management module 112 may, as part of extracting node 203 in FIG. 2, perform a file-management action on a constituent file extracted from container file 208.

The systems described herein may perform a variety of file-management actions on extracted constituent files. In some examples, file-management module 112 may simply respond to a request for a constituent file with the extracted constituent file. In other examples, file-management module 112 may convert an extracted constituent file from one type or form to another. For example, file-management module 112 may convert an extracted constituent file from a form not easily viewed in a web browser or on a mobile device to another form that is easily viewed in a web browser or on a mobile device.

In some examples, file-management module 112 may perform various file-indexing actions on an extracted file that enable the file to be later identified based on contents of the container file. For example, file-management module 112 may convert an extracted file to a text-based representation of the file and (2) use the text-based representation of the constituent file to index the constituent file. In some examples, file-management module 112 may convert an extracted file to text by extracting textual content from the file. In at least one example, file-management module 112 may convert an extracted file to text using optical character recognition. Upon completion of step 310, exemplary method 300 in FIG. 3 may terminate.

As explained above, by parsing file metadata contained within a container file before and/or without extracting or converting any or all of the container file's constituent files, the systems and methods described herein may create a content hierarchy for the container file that (1) includes the file metadata and hierarchical metadata of the container file's constituent files and that (2) may enable on-demand extraction of less than all of the container file's constituent files. Furthermore, in some examples, by enabling extraction of less than all of the container file's constituent files, the system and methods described herein may improve throughput of file archiving systems.

Moreover, by creating a content hierarchy for a container file before extracting the container file's constituent files, these systems and methods may perform metadata-parsing and file-extraction responsibilities on dedicated nodes within a cloud-based computing environment that are independently optimized to perform these different responsibilities.

Figure 7:
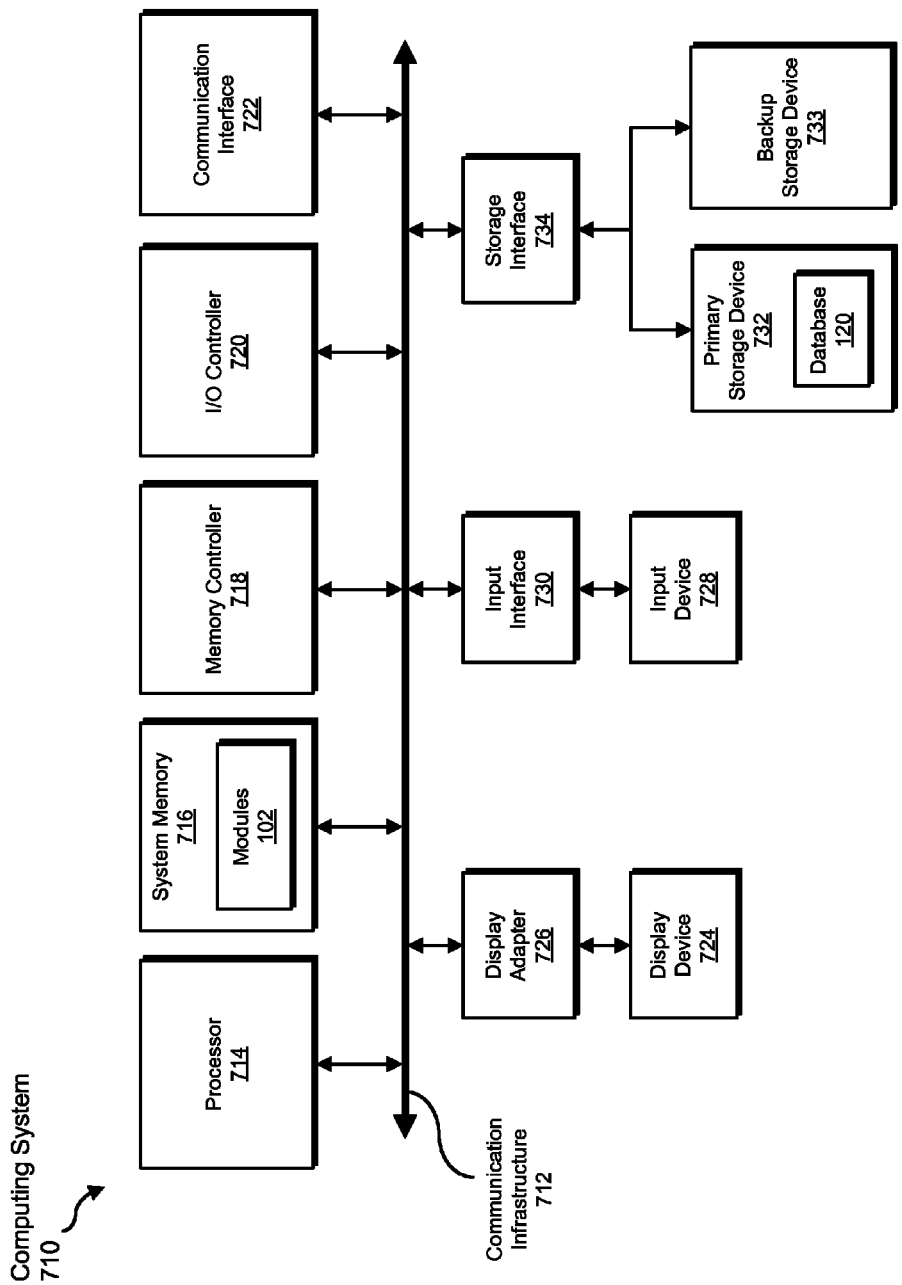
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
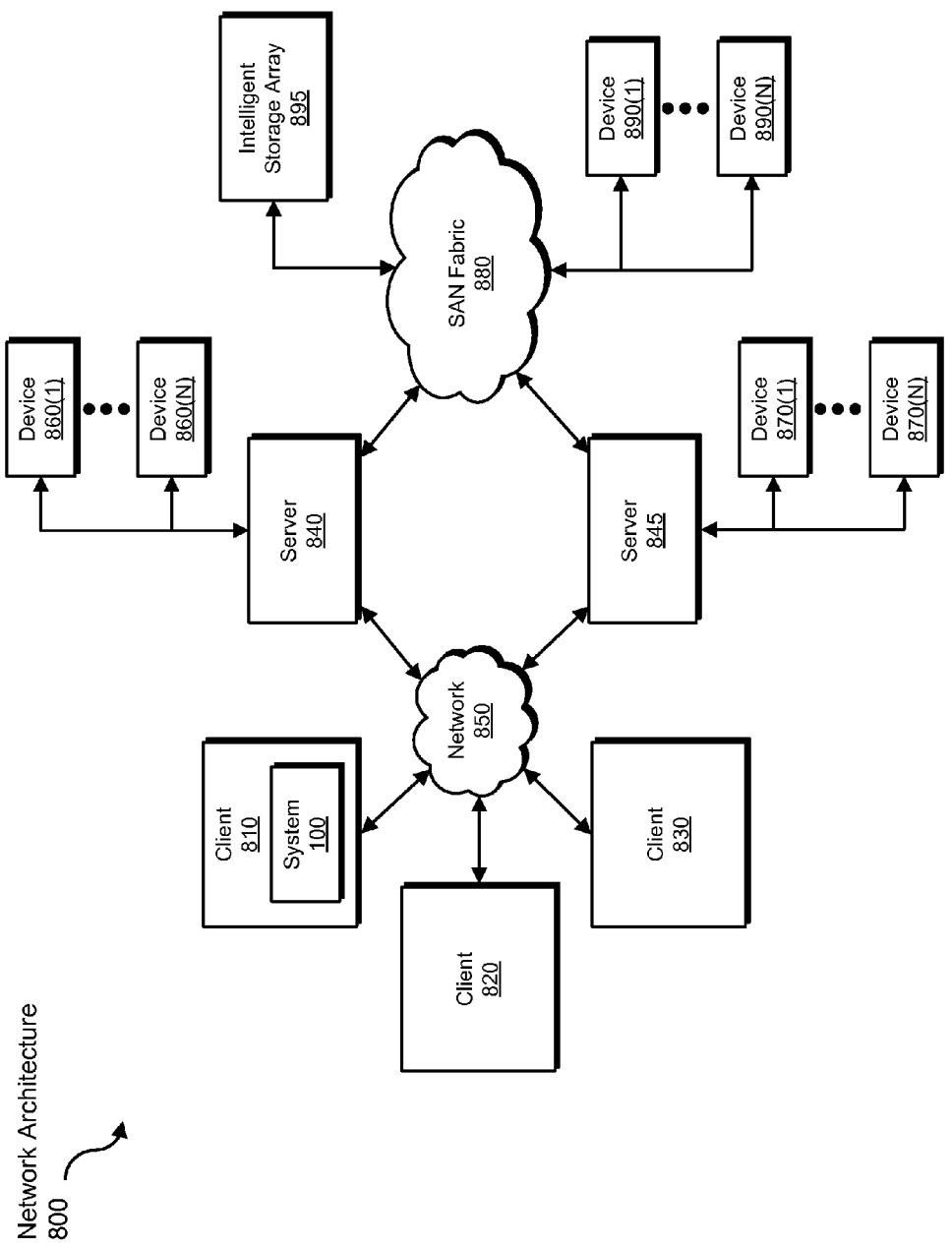
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for efficiently extracting contents of container files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a container file to be transformed, transform the container file and/or file metadata contained within the container file into a content hierarchy for the container file, output a result of the transformation to a system that is capable of extracting a constituent file contained within the container file without extracting all constituent files contained within the container file, use the result of the transformation to locate and extract the constituent file, and store the result of the transformation to a storage system for storing content hierarchies. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for efficiently extracting contents of container files, at least a portion of the method being performed by a computing device comprising at least one processor, the method comprising:
   receiving, at a first stage of a file-archiving system, an unnested container file containing a first constituent file and a second constituent file, wherein:
      the first constituent file is a nested container file that contains the second constituent file; and
      the file-archiving system is configured to perform a time-consuming file-indexing operation;
   enabling high file throughput at the first stage of the file-archiving system by refraining, at the first stage of the file-archiving system, from performing the time-consuming file-indexing operation;
   enabling a second stage of the file-archiving system to perform the time-consuming file-indexing operation on the second constituent file by creating, at the first stage of the file-archiving system, a content hierarchy for the unnested container file that comprises:
      metadata of the second constituent file;
      first hierarchical metadata that indicates that the unnested container file contains the nested container file; and
      second hierarchical metadata that indicates that the nested container file contains the second constituent file;
   using, at the second stage of the file-archiving system, the content hierarchy to locate the second constituent file within the nested container file;
   extracting, at the second stage of the file-archiving system, the second constituent file from the nested container file;
   performing, at the second stage of the file-archiving system, the time-consuming file-indexing operation on the second constituent file.

2. The computer-implemented method of claim 1, wherein:
   the file-archiving system comprises:
      at least one computing node that comprises hardware resources that are optimized to parse container-file metadata;
      at least one additional computing node that comprises additional hardware resources that are optimized to perform the time-consuming file-indexing operation;

the first stage of the file-archiving system is performed by the at least one computing node;
the second stage of the file-archiving system is performed by the at least one additional computing node.

3. The computer-implemented method of claim 1, wherein the file-indexing operation comprises a time-consuming content-conversion operation.

4. The computer-implemented method of claim 1, wherein:
the file-archiving system comprises an email archiving system;
the unnested container file comprises an email;
the nested container file comprises an attachment of the email.

5. The computer-implemented method of claim 1, wherein:
the second hierarchical metadata indicates that the second constituent file is at a hierarchical level within the unnested container file;
using the content hierarchy to locate the second constituent file within the nested container file comprises using the content hierarchy to locate one or more files at the hierarchical level within the unnested container file.

6. The computer-implemented method of claim 1, wherein:
the metadata of the second constituent file comprises a file type of the second constituent file;
using the content hierarchy to locate the second constituent file within the nested container file comprises using the content hierarchy to locate one or more files of the file type of the second constituent file.

7. The computer-implemented method of claim 1, wherein:
the metadata of the second constituent file comprises a size of the second constituent file;
using the content hierarchy to locate the second constituent file within the nested container file comprises using the content hierarchy to locate one or more files that are of the size.

8. The computer-implemented method of claim 1, wherein performing the time-consuming file-indexing operation on the second constituent file comprises converting the second constituent file to a text-based representation of the second constituent file.

9. The computer-implemented method of claim 8, wherein performing the time-consuming file-indexing operation on the second constituent file comprises using the text-based representation of the second constituent file to index the second constituent file.

10. The computer-implemented method of claim 1, further comprising:
after the content hierarchy has been created, receiving a request for the metadata of the second constituent file;
locating the metadata of the second constituent file stored within the content hierarchy;
responding to the request with the metadata of the second constituent file stored within the content hierarchy.

11. The computer-implemented method of claim 1, wherein:
the unnested container file comprises a third constituent file;
the step of extracting the second constituent file from the nested container file is performed without extracting the third constituent file from the unnested container file.

12. The computer-implemented method of claim 1, wherein:
the content hierarchy comprises hierarchical metadata for each file contained within the unnested container file;
the content hierarchy is completely created at the first stage of the file-archiving system before any file is extracted at the second stage of the file-archiving system.

13. The computer-implemented method of claim 1, wherein no files are extracted from the unnested container file at the first stage of the file-archiving system.

14. The computer-implemented method of claim 1, wherein:
the unnested container file comprises an additional nested container file;
the additional nested container file contains the nested container file;
the first hierarchical metadata indicates that the unnested container file contains the additional nested container file;
the content hierarchy comprises third hierarchical metadata that indicates that the additional nested container file contains the nested container file.

15. The computer-implemented method of claim 1, wherein:
the unnested container file contains metadata of the nested container file that is separate and distinct from the nested container file;
the nested container file contains the metadata of the second constituent file that is separate and distinct from the second constituent file.

16. A system for efficiently extracting contents of container files, the system comprising:
a file-receiving module, stored in memory, that receives, at a first stage of a file-archiving system, an unnested container file containing a first constituent file and a second constituent file, wherein:
the first constituent file is a nested container file that contains the second constituent file; and
the file-archiving system is configured to perform a time-consuming file-indexing operation;
a creating module, stored in memory, that:
enables high file throughput at the first stage of the file-archiving system by refraining, at the first stage of the file-archiving system, from performing the time-consuming file-indexing operation; and
enables a second stage of the file-archiving system to perform the time-consuming file-indexing operation on the second constituent file by creating, at the first stage of the file-archiving system and before the second constituent file is extracted from the nested container file, a content hierarchy for the unnested container file that comprises:
metadata of the second constituent file;
first hierarchical metadata that indicates that the unnested container file comprises the nested container file; and
second hierarchical metadata that indicates that the nested container file comprises the second constituent file;
a locating module, stored in memory, that uses, at the second stage of the file-archiving system, the content hierarchy to locate the second constituent file within the nested container file;
an extracting module, stored in memory, that extracts, at the second stage of the file-archiving system, the second constituent file from the nested container file;

a file-management module, stored in memory, that performs, at the second stage of the file-archiving system, the time-consuming file-indexing operation on the second constituent file; and at least one processor that executes the file-receiving module, the creating module, the locating module, the extracting module, and the file-management module.

17. The system of claim 16, wherein:

the file-archiving system comprises:
- at least one computing node that comprises hardware resources that are optimized to parse container-file metadata;
- at least one additional computing node that comprises additional hardware resources that are optimized to perform the time-consuming file-indexing operation;

the first stage of the file-archiving system is performed by the at least one computing node;

the second stage of the file-archiving system is performed by the at least one additional computing node.

18. The system of claim 16, wherein:

the file-archiving system comprises an email archiving system;

the unnested container file comprises an email;

the nested container file comprises an attachment of the email.

19. The system of claim 16, wherein:

the second hierarchical metadata indicates that the second constituent file is at a hierarchical level within the unnested container file;

the locating module uses the content hierarchy to locate the second constituent file within the nested container file by using the content hierarchy to locate one or more files at the hierarchical level within the unnested container file.

20. A non-transitory computer-readable medium comprising one or more computer-executable instructions that, when executed by at least one processor of a computing device, cause the computing device to:

receive, at a first stage of a file-archiving system, an unnested container file containing a first constituent file and a second constituent file, wherein:
- the first constituent file is a nested container file that contains the second constituent file; and
- the file-archiving system is configured to perform a time-consuming file-indexing operation;

enable high file throughput at the first stage of the file-archiving system by refraining, at the first stage of the file-archiving system, from performing the time-consuming file-indexing operation;

enable a second stage of the file-archiving system to perform the time-consuming file-indexing operation on the second constituent file by creating, at the first stage of the file-archiving system, a content hierarchy for the unnested container file that comprises:

metadata of the second constituent file;

first hierarchical metadata that indicates that the unnested container file comprises the nested container file; and second hierarchical metadata that indicates that the nested container file comprises the second constituent file;

use, at the second stage of the file-archiving system, the content hierarchy to locate the second constituent file within the nested container file;

extract, at the second stage of the file-archiving system, the second constituent file from the nested container file;

perform, at the second stage of the file-archiving system, the time-consuming file-indexing operation on the second constituent file.

\* \* \* \* \*